July 15, 1952　　　C. A. ERDMAN, JR　　　2,603,737
CAPACITOR-ADJUSTING APPARATUS
Filed May 22, 1948　　　6 Sheets-Sheet 1
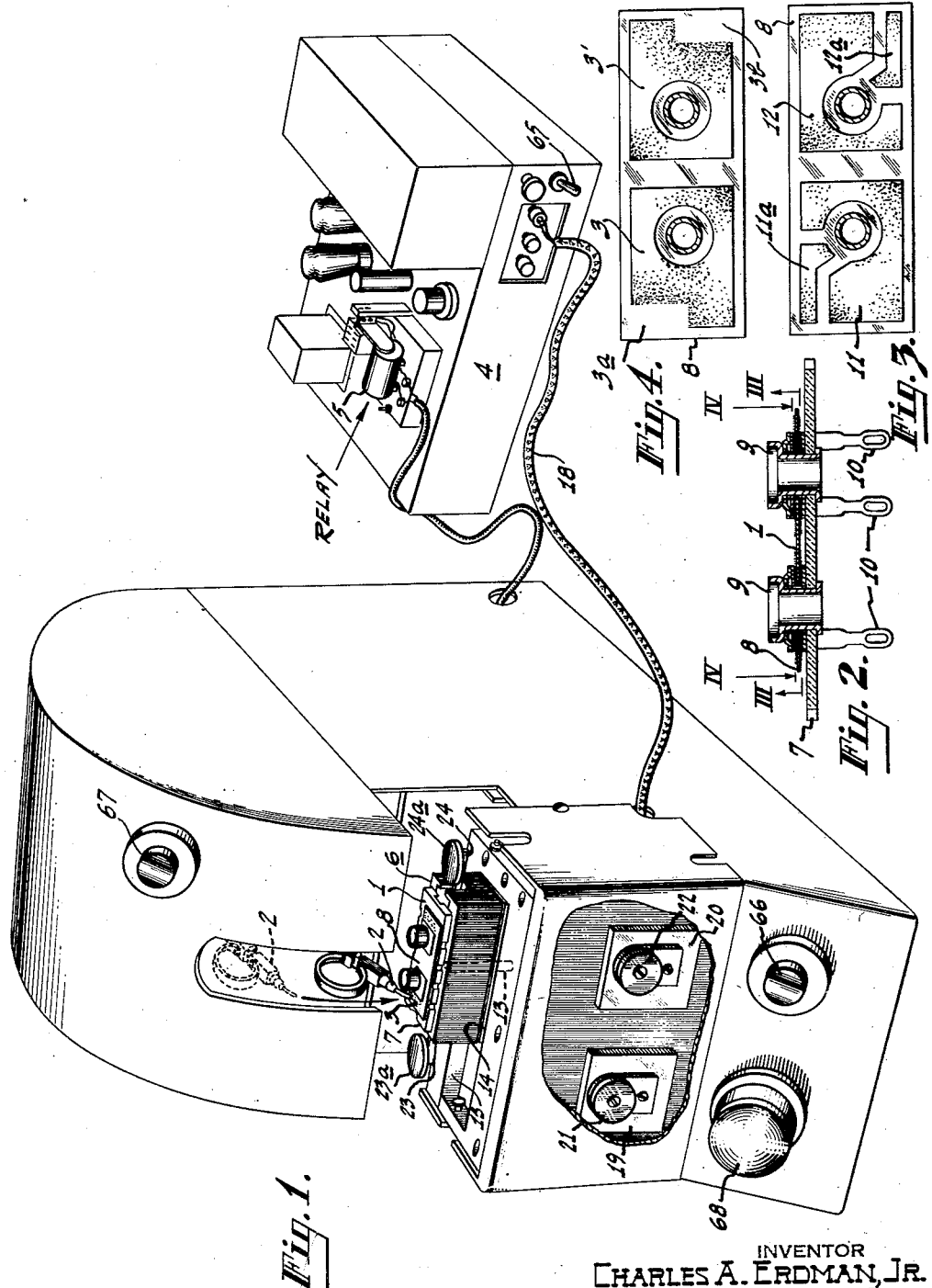
INVENTOR
CHARLES A. ERDMAN, JR.
BY
ATTORNEY July 15, 1952  C. A. ERDMAN, JR  2,603,737
CAPACITOR-ADJUSTING APPARATUS Filed May 22, 1948  6 Sheets—Sheet 2

INVENTOR
CHARLES A. ERDMAN, JR.
BY
ATTORNEY

July 15, 1952

C. A. ERDMAN, JR 2,603,737

CAPACITOR-ADJUSTING APPARATUS

Filed May 22, 1948

INVENTOR
CHARLES A. ERDMAN, JR.
BY
ATTORNEY

July 15, 1952 — C. A. ERDMAN, JR — 2,603,737
CAPACITOR-ADJUSTING APPARATUS
Filed May 22, 1948 — 6 Sheets-Sheet 5

Inventor
CHARLES A. ERDMAN, JR
By Morris A. Kahn
Attorney

July 15, 1952     C. A. ERDMAN, JR     2,603,737
CAPACITOR-ADJUSTING APPARATUS
Filed May 22, 1948     6 Sheets-Sheet 6
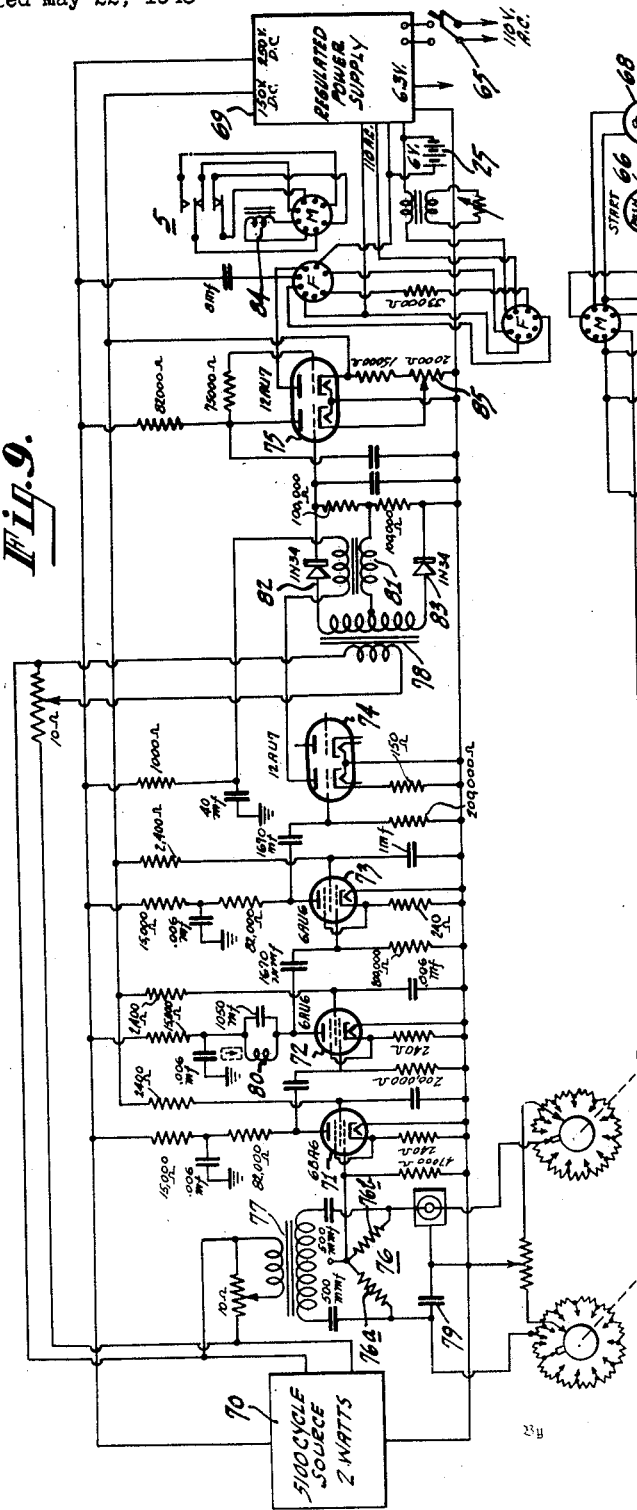
Inventor
Charles A. Erdman, Jr.
Attorney Patented July 15, 1952

2,603,737

UNITED STATES PATENT OFFICE 2,603,737

CAPACITOR-ADJUSTING APPARATUS

Charles A. Erdman, Jr., Haddon Heights, N. J., assignor to Radio Corporation of America, a corporation of Delaware Application May 22, 1948, Serial No. 28,599

7 Claims. (Cl. 219—19)

This invention relates to the art of permanently adjusting the electrical values of capacitors of the type wherein at least one of the armatures comprises metal applied in a finely divided state to a piece of mica or other dielectric material.

Heretofore in the mass production of so-called "metallized-mica" capacitors it has been impossible economically to achieve exactly duplicate values of capacitance. This is so because of the inherent lack of uniformity in the thickness of even the most carefully gauged pieces of mica. Nor can perfectly uniform values of capacitance always be achieved by the use of mica substitutes, because it is not always possible to maintain exact uniformity in the metallizing process.

Thus, up to now, a manufacturer seeking to establish a nice degree of electrical uniformity for his capacitors has been obliged either (a) to pay premium prices for mica of close thickness-tolerances and to exercise extreme precautions in the control of whatever metallizing process he elected to use or (b) to resort to the use of a tedious hand-finishing operation involving the etching or scratching away of some of the armature metal and the repeated comparison of each partially etched capacitor with a standard.

The cut-and-try nature of the above described hand-finishing operation adds considerably to the cost of the finished capacitors not only because of the manual labor involved but also because human errors in judgment and skill result in the production of a substantial percentage of non-usable elements.

Accordingly, the principal object of the present invention is to obviate the foregoing and other difficulties incident to the manufacture of "metallized-mica" capacitors and, more specifically, to provide a highly accurate, inexpensive and trouble-free method of and apparatus for adjusting the capacitance of such capacitors.

In the accompanying six sheets of drawings:

Fig. 1 is a view in perspective of a capacitance-adjusting machine and a control unit therefor, both constructed and operated in accordance with the principle of the invention.

Fig. 2 is a sectional elevation of a pronged unit comprising four elemental mica - capacitors which will be referred to in describing the operation of the apparatus of the invention.

Fig. 3 is a bottom plan view taken along the line 3—3 of Fig. 2 showing the pattern of the armature-metal on the mica.

Fig. 4 is a top plan view taken on the line 4—4 of Fig. 2 showing the pattern of the armature-metal on the top of the mica.

Fig. 9 is a wiring diagram for the several parts of the machine, including the capacitive bridge and the motor control circuits.

Figure 5:
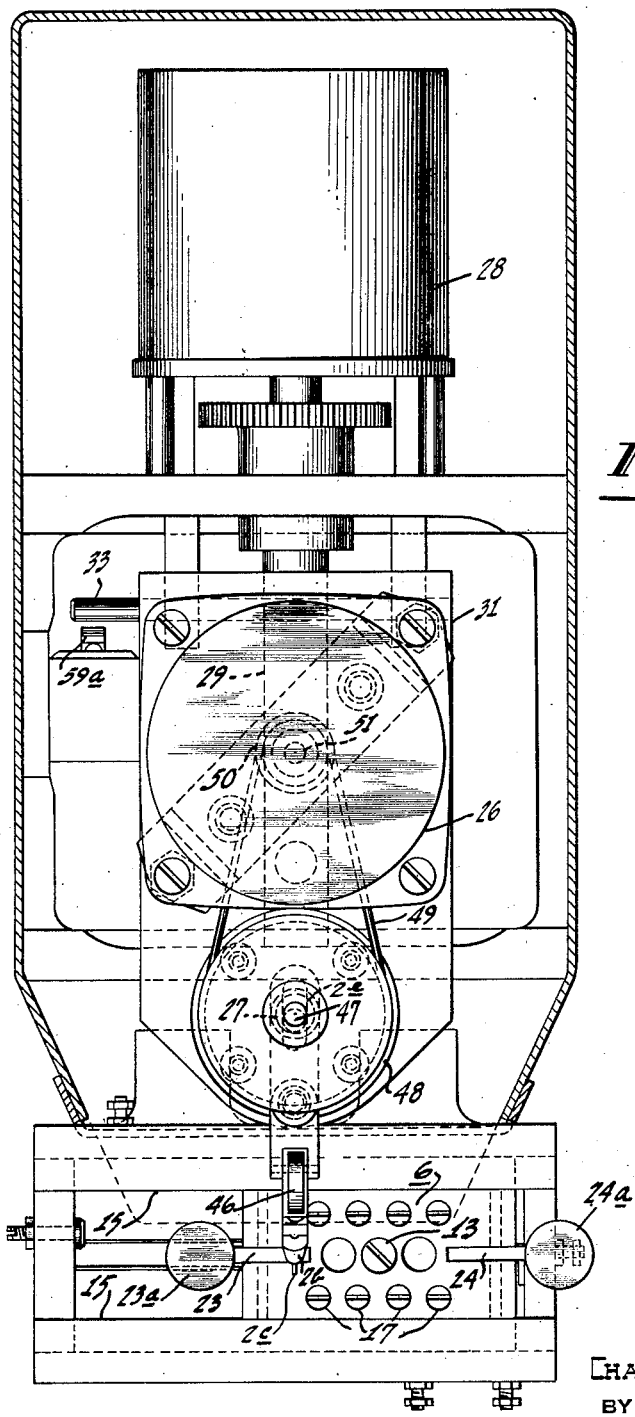
Fig. 5 is a top plan view, with the cover removed, of the capacitor adjusting machine of Fig. 1.

The present invention contemplates, and its practice provides, a method of adjusting the capacitance of a "metallized-mica" capacitor (indicated generally at 1, Figs. 1 and 2), which comprises erasing, by burning-away, as with a retractable electrically-energized oscillating stylus 2, a portion of a film-like metal armature of the capacitor while measuring its capacitance, as by means of a capacitive-bridge 4, and automatically halting, by means of an electrical relay 5, the erasing operation when the desired value of capacitance has been achieved.

In the practice of the method of the invention the capacitor to be treated is preferably presented in a fixed position, as on a jig 6, to the retractable oscillating stylus 2. The particular form of jig shown in the drawings is especially constructed to accommodate the assembly of elemental capacitors shown in Figs. 2, 3 and 4 and described in copending application of Donald Mackey, Ser. No. 17,359, filed March 26, 1948, now Patent No. 2,544,508. The said capacitor assembly comprises a base plate 7 constituted of insulating material, to the top surface of which a single strip of mica 8 is secured as by means of a pair of grommets 9 (which may serve as pedestals for a pair of upstanding coils, not shown) and by a number of dependent bent-metal prongs 10. The undersurface of the mica strip 8 (see Fig. 3) has four discrete metallized areas 11, 11a, 12, 12a inclusive, thereon, and the upper surface has two metallized areas 3, 3' (see Fig. 4) thereon, each of which extends toward two corners of the mica and overlaps two (11, 11a, 12, 12a, respectively) of the underlying metallized areas. It will be observed that the four metallized areas on the undersurface of the mica are of two different sizes, the ones on the same diagonals of the strip being of the same size. Thus, there are actually two pairs of capacitors in the assembly, the capacitors constituting one pair being on one diagonal of the plate and the capacitors of the other pair being on the other diagonal. Accordingly, in order to permit each of the four capacitors of the work piece to be selectively presented to the erasing stylus 2, the jig 6 is mounted on a central pivot 13 to permit of 180° rotation on a carriage 14 which is supported for slideable movement on tracks 15 which extend across the front of the machine, beneath the stylus.

The pivotedly mounted jig 6 is provided with a number of jacks 16 (see Fig. 7) within which the prongs 10 of the dual capacitor 1 are received. These jacks 16 terminate adjacent to the lower surface of the jig and there are a similar number of electrical contacts 17 on the facing surface of the carriage. The lower terminals of the jacks 16 and the contacts 17 are symmetrically arranged (see Fig. 9) so that irrespective of which one of the four capacitor elements is presented to the stylus it will be connected in circuit, through a concentric transmission line 18 to the capacitive bridge unit 4.

The capacitive bridge unit 4 is preferably set to trigger the relay 5 at some fixed value (say 100 mmf.). Thus, if the two pairs of capacitors on the jig 6 are to be adjusted to different values (e. g. 33 mmf. and 150 mmf., respectively) other than that of the fixed value (i. e. 100 mmf.) of the capacitive bridge circuit, it is necessary to provide a "padding" condenser in the circuit between that particular elemental capacitor and the bridge 4 in order to trigger the relay 5. Accordingly, two sockets 19 and 20 are provided at the front of the machine, beneath the jig 6, for removably connecting appropriate padding condensers 21 and 22 in series or in parallel, in the said bridge circuit.

As shown most clearly in Figs. 1 and 5 the jig 6 is provided with a pair of small lever arms 23 and 24, which extend beneath the opposite edges of the base 7 of the work-piece 1. These levers terminate at their outer ends in tabs or keys 23a, 24a which, when pushed down, operate to lift the said piece and thereby facilitate its removal from the jig.

As will hereinafter more fully appear, when the stylus 2 is "down" (and the relay 5 is open) it is normally in circuit with a source 25 (Fig. 9) of direct current. Accordingly, when the stylus is brought down on the film-like armature-surface of the capacitor 1, a circuit is completed through the stylus and the said metal film (3 or 3'). The resulting flow of current through this extremely thin film generates heat of sufficient intensity to melt, vaporize or burn-away the metal film over whatever area (3a, 3b, Fig. 4) is exposed to the stylus during its two-dimensional (i. e. "left-to-right" and "forward") "scanning" movement.

As indicated by the vertical arrow in Fig. 1 the erasing stylus 2 is arranged to be moved upwardly away from the work upon completion of its above mentioned "scanning" movement. The manner in which these several movements are imparted to the stylus will be apparent upon inspection of Fig. 7 wherein it will be observed (1) that the oscillating or left-to-right movement is imparted to the stylus by a first motor 26 through an eccentric 27, (2) that a second motor 28, operates through a lead screw 29 and a spring-biased half nut or follower 30 to move the platform 31 upon which the stylus is mounted, forwardly, and (3) the vertical movement of the stylus is provided by a third motor 32 which operates, in a manner later described, to tilt the said platform rearwardly (see Fig. 8) on a hinge 33.

Figure 7:
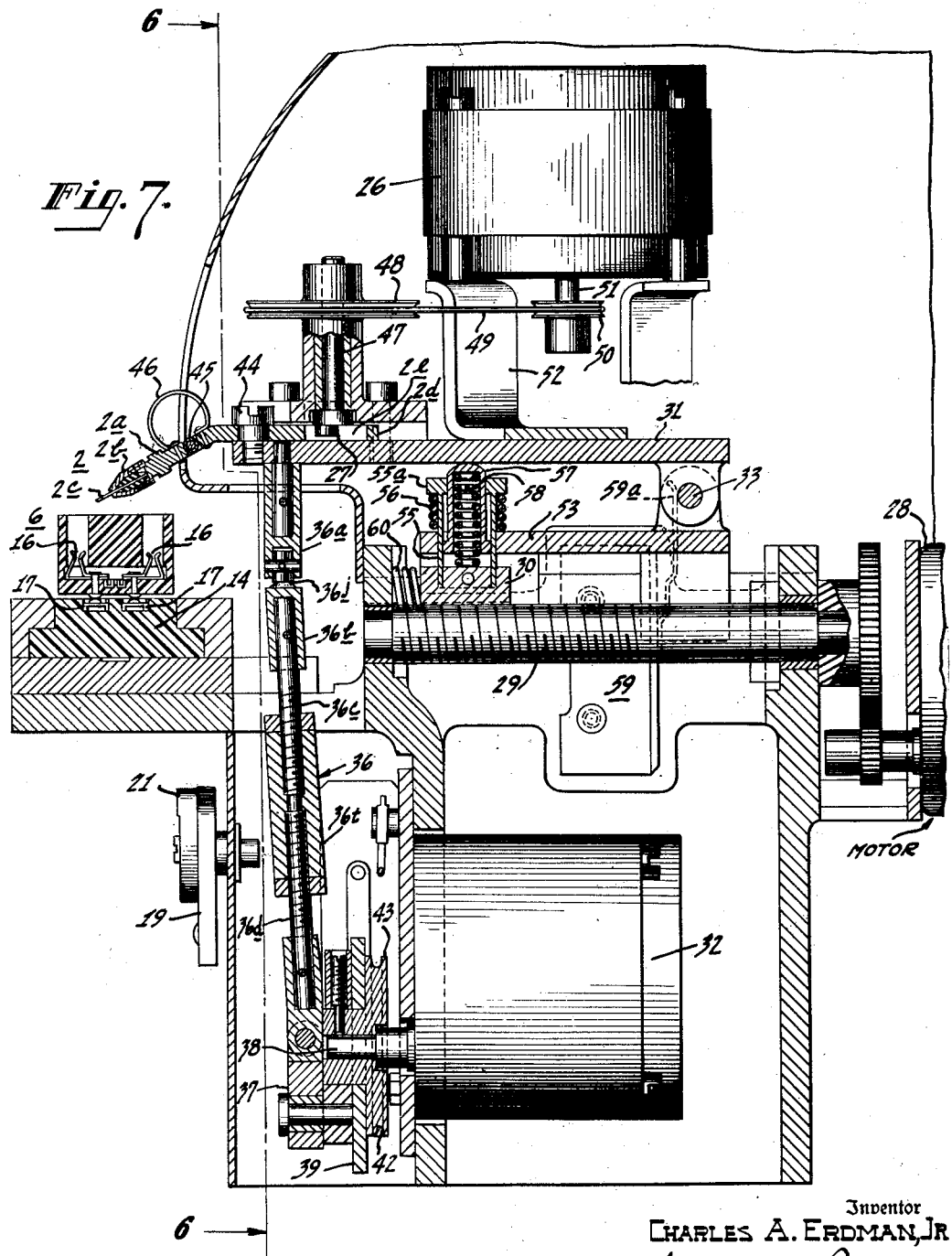
Fig. 7 is a vertical section of the machine taken on the line 7—7 of Fig. 6 with the carriage for the stylus in its "down" position.

In Fig. 7 the stylus 2 is "down" and has reached the limit of its forward position, as if it were just about to complete its "scanning" movement. At that moment the motor 26 which provides the "left-to-right" movement of the stylus and the motor 28 which moves the platform 31 (and hence the stylus 2) in the "forward" direction are both running and the motor 32 which controls the upward and downward movement of the stylus (by tilting its platform 31) is idle.

Figure 6:
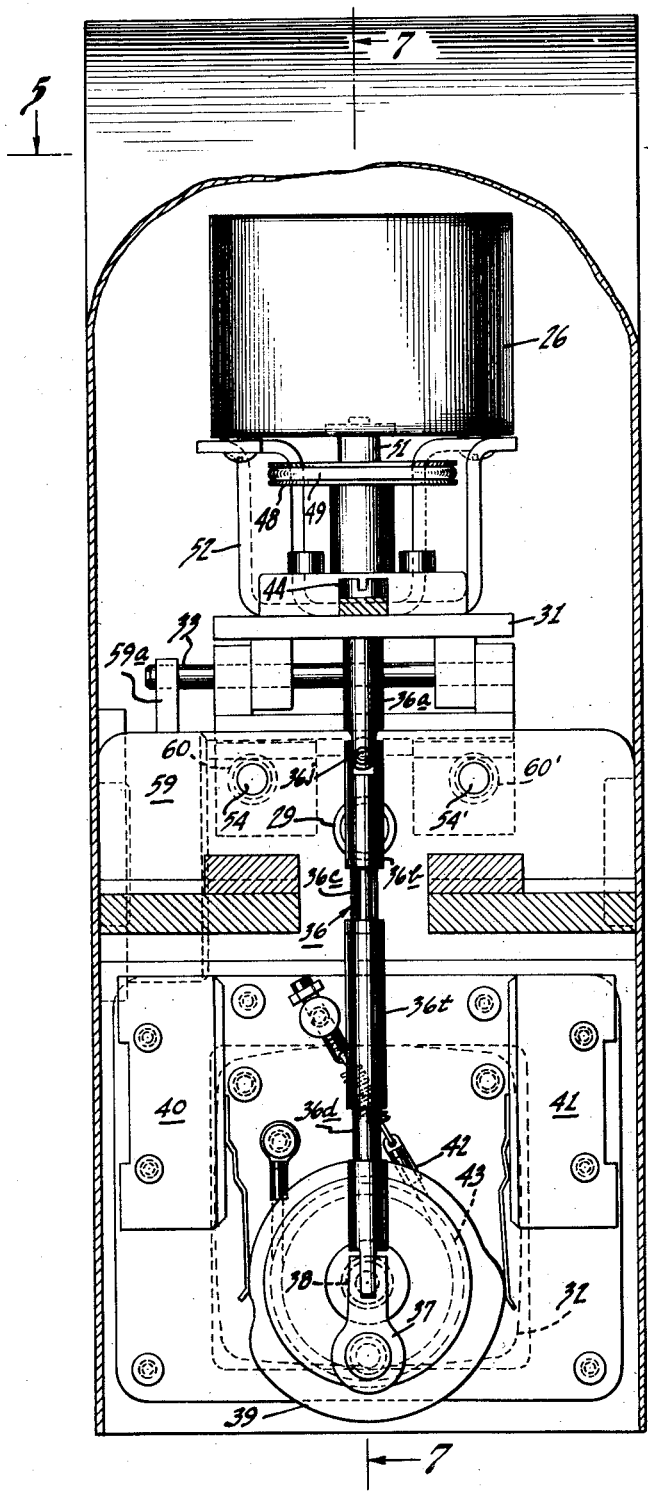
Fig. 6 is a front elevation of the machine taken on the line 6—6 of Fig. 7.

The manner in which the motor 32 operates to raise and lower the tiltable platform 31 upon which the stylus 2 is supported is shown more clearly in Fig. 6 wherein it will be observed that there is a coupling rod 36 which is affixed at its upper end to the free end of the said platform and, at its opposite or lower end, to an eccentric 37 on the shaft 38 of the said motor 32. It will be noted that this coupling rod 36 consists of several sections; 36a, 36b, etc., the upper sections 36a, 36b being connected by a universal joint 36j (to compensate for the forward, rearward, and tiltable movements of the platform 31) and the lower sections 36c and 36d being connected by a turnbuckle 36t (to permit of minor adjustments in its effective length). In addition to the eccentric 37 the motor shaft 38 carries a cam 39 which serves to operate two normally closed "limit" switches 40 and 41. The switch 41 when pressed in by the cam 39 stops the motor 32 when the carriage 31 (and hence the rod 36 and eccentric 37) are "down" and the other switch 40 stops it when the carriage is in its raised or "up" position—shown in Fig. 8. A spring tensioned leather belt 42, which is wrapped about a grooved pulley 43 on the shaft 38, serves as a brake and prevents the motor 32 from coasting when either of the switches 40 or 41 is opened.

Figure 8:
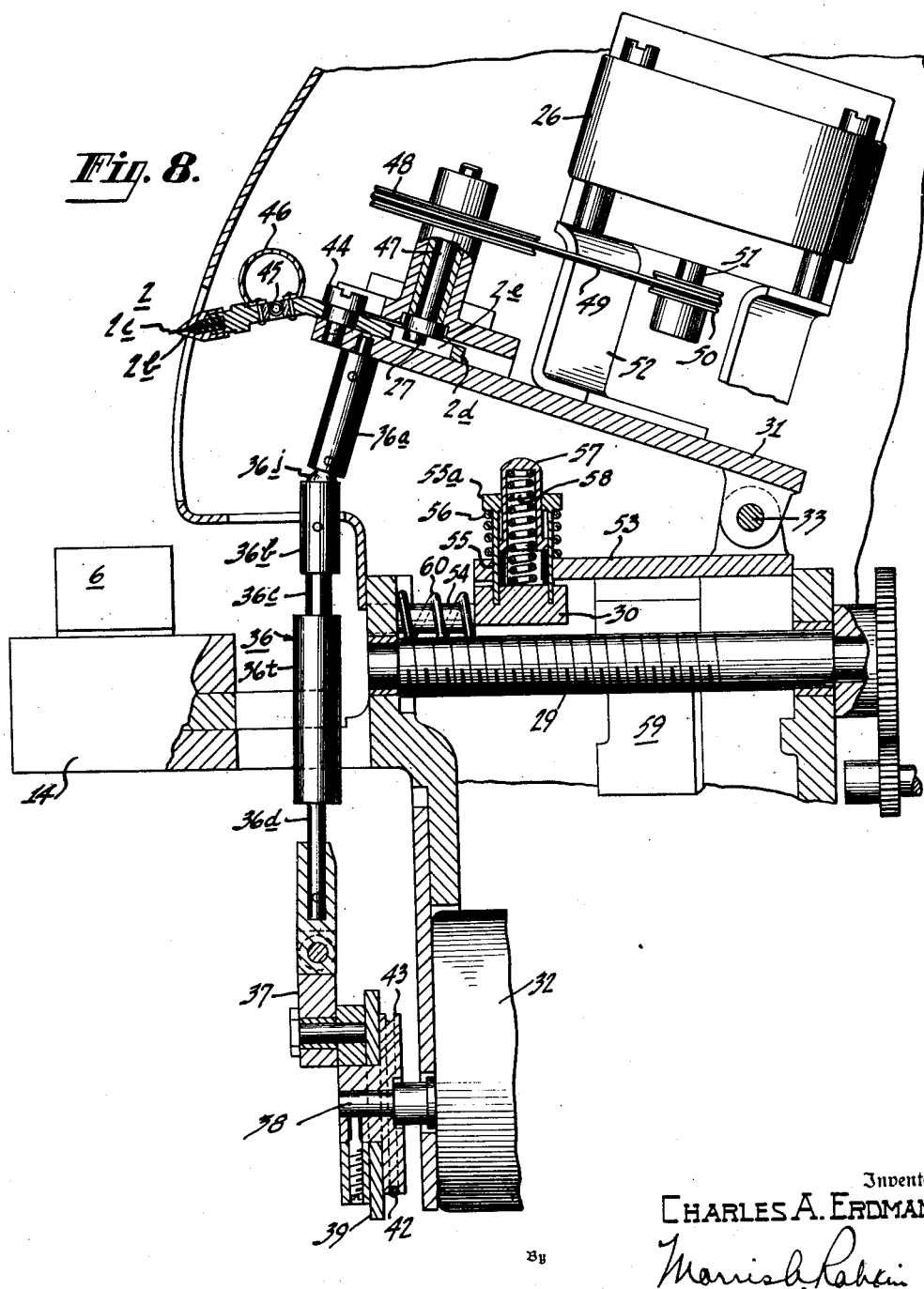
Fig. 8 is a vertical section of the machine, similar to Fig. 7, but showing the carriage for the stylus in its idle or raised position.

Referring to both Figs. 7 and 8; it will be observed that the stylus 2 consists of an outwardly extending downwardly inclined part 2a which terminates in a collar 2b (which retains the removable point 2c), and a horizontal rearwardly extending substantially flat body portion 2d which is secured, intermediate its ends, to the upper surface of the tiltable carriage 31 by a pivot 44. The part 2a of the stylus, to which the point 2c is affixed by the collar 2b, is joined to the body portion 2d by a horizontally disposed hinge 45 and by a bowed spring 46 which is biased to urge the point downwardly into contact with the metalized surface of the capacitor (not here shown) in the jig 6 and thus to compensate for any minor irregularities in the said surface. This bowed spring 46 also serves to conduct the direct current from the source 25 to the point of the stylus, around the hinge 45. The part 2d of the stylus which is connected to the tiltable platform 31 by the pivot 44 is provided with a non-circular slot 2e. Movement of the eccentric 27 in contact with the inner surface of the said slot causes the stylus to move about its pivot 44, to the left and to the right, as viewed from the front of the machine. The eccentric 27 is fixed on the lower end of a vertically extending rotatable shaft 47 which carries a pulley 48 adjacent to its upper end. A belt 49 which runs between the said pulley 48 and a second pulley 50, on the shaft 51 of the motor 26, drives the shaft 47 and hence the eccentric 27 and stylus 2. The motor 26, in the instant case, is supported on a bracket 52 which is affixed to the tiltable platform 31 and will be understood to run continuously, i. e. so long as the power is on and irrespective of the position of the said platform.

As previously brought out the "scanning" movement of the stylus 2 actually consists of two simultaneous movements, i. e., the "left-to-right" movement (provided by the motor 26 and eccentric 27) and the "forward" movement provided by the motor 28 which operates through a lead screw 29 and the spring-biased half nut or follower 30 to advance the tiltable platform 31 upon which the stylus is mounted. The manner in which the forward movement of the platform 31 is accomplished is as follows: The tiltable platform 31 is connected by its hinge 33 to an undercarriage 53 which is mounted for slidable movement on two rod-like tracks 54, 54' (see Fig. 6) disposed on opposite sides of the lead screw 29. The complementarily threaded nut or follower 30 is supported upon a hollow plunger 55 on the forward end of the carriage 53 for vertical movement into and out of driven engagement with the lead screw 29. The plunger 55 has a coil spring 56 wrapped about its outer surface and which bears at its upper end on the underside of the head 55a of the plunger and, at its lower end, upon the top surface of the carriage 53. The biasing force provided by the spring 56 thus tends to lift the nut or follower 30 out of driven relation with the lead screw 29. The upper end 55a of the plunger 55, however, is presented to the underside of the tiltable platform 31 so that, when the said platform is brought down (as shown in Fig. 7) the plunger is depressed and urges the follower 30 into driven relation with the lead screw 29. The plunger 55 is preferably provided with an inner plunger 57, which extends upwardly beyond the head 55a, and with a relatively light inner spring 58 which bears upon the upper surface of the half-nut or follower 30 so that, when the platform is brought down it first engages the inner plunger 57 and urges the follower gently into contact with the lead screw 29. Actual engagement of the complementary threads on the half-nut 30 and lead screw 29 does not occur, however, until the outer plunger 55 reaches the lower limit of its movement and has overcome the biasing force of its outer spring 56.

Since the half-nut or follower 30 is effectively supported upon the carriage 53 it will be apparent that any forward movement applied to the said follower nut by the rotating lead screw 29 will be transmitted to the said carriage 53 and to the platform 31, and therefore to the oscillating stylus 2.

The above-described forward movement of the carriage 53 and platform 31 is halted, ordinarily, when the relay 5 of the capacitive-bridge unit 4 actuates the motor 32 which lifts the tiltable platform 31 off the follower nut 30. If, for any reason, the relay 5 fails to operate, the forward movement of the carriage 53 and its platform 31 is automatically halted by a normally open auxiliary switch 59 (see Figs. 6 and 7) which has its switch arm 59a mounted in the forward path of movement of the hinge 33 which connects the tiltable platform 31 to its carriage 53.

The power required to move the carriage 53 in the reverse direction, to its starting position (when the platform is "up"), is supplied by a pair of coil springs 60, 60' (Figs. 7 and 8), which are conveniently disposed about the rod-like tracks 54, 54', respectively, on which the carriage moves.

It will be observed upon inspection of Fig. 1, that the capacitive bridge unit 4 is provided with a line switch 65 and that the front of the machine is provided with two control buttons 66 and 67, respectively. The lower button 66 has an indicator lamp 68 associated therewith and comprises the "start" switch. The upper button 67 comprises the control element of a "re-set" switch. The various circuits in which these three switches 65, 66, and 67 are connected are shown diagrammatically in Fig. 9, wherein it will be understood that the adjacent male (M) and female (F) socket members provide appropriate connections between adjacent circuits.

Referring to Fig. 9, it will be noted that the line switch 65 controls the energization of a regulated power supply unit 69, which may be of any conventional design adapted to supply appropriate operating potentials to an audio-frequency (say, 5100 C. P. S.) oscillator 70, and a bank of, say, five electron tubes 71 to 75 inclusive, the functions of which are later described. The audio-frequency voltage from the oscillator 70 is applied to an electrical bridge 76, through a suitable "isolation" transformer 77, and simultaneously to a second transformer 78 which forms a part of a phase discriminator network, later described. The bridge 76 is connected through the concentric transmission line 18 and jig 6 to the capacitor being adjusted. As the capacitance of the capacitor is decreased by the movement of the stylus 2 thereon the bridge 76 approaches a balanced condition and, at the instant of true balance, the voltage developed across its fixed resistive arms 76a and 76b and the "capacitive arms" (i. e. the standard capacitor 79 and the capacitance of the jig 6, work 1, and transmission line 18) is changing in such a manner that the voltage across the "detector" terminals of the bridge changes phase. An amplifier comprising the four high gain stages 71, 72, 73, and 74 and including a harmonic filter comprising a tuned circuit 80 in the plate circuit of the second tube (72) applies the voltage from the bridge circuit to a transformer 81 in the phase discriminator network. This conventional phase discriminator network incorporates two diodes, 82, 83 and develops a D. C. voltage of a polarity determined by the polarity of the "unbalance" voltage from the bridge. This D. C. voltage is applied to the D. C. amplifier 75, the output of which is connected to the armature coil 84 of the relay 5. The closing point of the relay with respect to the condition of balance of the bridge is adjustable by a biasing resistor 85 in the cathode circuit of the D. C. amplifier 75. When the relay 5 closes, the circuit to the re-set motor 32 is re-closed, and the circuit to the D. C. source 25 of "burning" current for the stylus is opened. As previously set forth, the motor 32 operates to lift the stylus off the work and the said motor is shut-off with the stylus in its raised position when the cam 39 opens the normally closed micro-switch 40.

It should now be apparent that the present invention provides a highly accurate, inexpensive and trouble-free method of and apparatus for permanently adjusting the capacitance of capacitors of the type wherein at least one of the armatures comprises the metalized surface of a dielectric.

What is claimed is:

1. A machine for reducing the capacitance of a capacitor of the type wherein at least one of the armatures comprises a metalized surface of a dielectric, said machine comprising a metal stylus mounted to permit of horizontal and vertical scanning movements in a common plane, automatic mechanical means including a plurality of cams and a driving motor therefor associated with said stylus for imparting said scanning movement thereto, means for presenting said armature to said stylus in said plane, and means including said stylus for applying to said metalized surface an electric current of a value sufficient to disintegrate the metal encountered by said stylus during its said scanning movements upon said surface.

2. The invention as set forth in claim 1 and wherein spring means are provided for biasing said stylus into contact with said metalized surface.

3. The invention as set forth in claim 1, and wherein said stylus is mounted to permit of movement in a direction substantially normal to said plane whereby said stylus is rendered removable from said surface upon completion of said scanning movements.

4. The invention as set forth in claim 1 and wherein the means for presenting said armature to said stylus comprises a support for said capacitor, a carriage upon which said support is mounted for pivotal movement in said plane, and a track upon which said carriage is adapted to ride, whereby different areas on the diagonals of said metalized surface may be presented to said stylus.

5. A machine for reducing, to a desired value, the capacitance of a capacitor of the type wherein at least one of the armatures comprises a metalized surface of a dielectric, said machine comprising: a metal stylus mounted to permit of horizontal and vertical scanning movements in a common plane, means for imparting said scanning movements to said stylus, means for presenting said metalized surface to said stylus in said plane, means including said stylus for applying to said surface an electric current of a value sufficient to disintegrate the metal encountered by said stylus during its said scanning movements, a bridge circuit operatively connected to said capacitor and responsive to the effect of the resulting reduction in the metalized area of said dielectric upon the capacitance of said capacitor, and relay means responsive to an operative condition of said bridge circuit for de-energizing said stylus when the capacitance of said capacitor has been reduced to said desired value.

6. A machine for reducing, to a desired value, the capacitance of a capacitor of the type wherein at least one of the armatures comprises a metalized surface of a dielectric, said machine comprising: a metal stylus mounted to permit of horizontal and vertical scanning movements in a common plane and for movement in a direction substantially normal to said plane, means for imparting said scanning movements to said stylus, a jig for presenting said metalized surface to said stylus in said plane, a source of current connected to said stylus and of a value sufficient to disintegrate the metal encountered by said stylus during its said scanning movements, an electrical bridge connected to said capacitor through said jig and responsive to the effect of the resulting reduction in the metalized area of said dielectric upon the capacitance of said capacitor, and means responsive to an operative condition of said bridge, for moving said stylus in said substantially normal direction away from said metalized surface when the capacitance of said capacitor has been reduced to said desired value.

7. A machine for reducing the capacitance of a capacitor of the type wherein at least one of the armatures comprises a metalized surface of a dielectric, said machine comprising: a jig for said capacitor, a carriage mounted to permit of forward and rearward movement with respect to said jig, a tiltable platform on said carriage, a stylus pivotedly mounted on said platform for reciprocating movement along a line substantially at right angles with respect to the line of movement of said carriage, the point of said stylus extending beyond the front of said platform and adapted when said platform is "down" to contact the metalized surface of the capacitor in said jig, means mounted on said platform for imparting said reciprocating movement to said stylus, means for tiltably lowering and raising said platform on said carriage to bring said stylus into and out of contact with said metalized surface of said capacitor, means responsive to said lowering movement of said platform for imparting said forward movement to said carriage and hence to said platform and stylus, a source of current connected to said stylus of a value sufficient to disintegrate the metal encountered by said stylus during its said reciprocating and forward movements in contact with said metalized capacitor-surface, a capacitive bridge connected to said capacitor through said jig, a relay connected to said bridge, biasing means associated with said bridge for operating said relay when the capacitance of said capacitor and of said bridge are balanced by the disintegration of a portion of said capacitor-surface, means responsive to the operation of said relay for tiltably raising said platform on said carriage to remove said stylus from said capacitor surface, and means responsive to said last mentioned movement of said platform for moving said carriage and hence said platform and said stylus rearwardly with respect to said jig.

CHARLES A. ERDMAN, JR.

REFERENCES CITED

The following references are of record in the file of this patent:

UNITED STATES PATENTS

| Number | Name | Date |
| --- | --- | --- |
| 1,824,341 | Gill | Sept. 22, 1931 |
| 1,939,883 | Edwards et al. | Dec. 19, 1933 |
| 2,248,057 | Bond | July 8, 1941 |
| 2,253,026 | Godsey, Jr. | Aug. 19, 1941 |
| 2,291,445 | Beyer | July 28, 1942 |
| 2,435,441 | Grouse | Feb. 3, 1948 |

FOREIGN PATENTS

| Number | Country | Date |
| --- | --- | --- |
| 262,272 | Great Britain | Dec. 9, 1926 |
| 440,948 | Great Britain | Jan. 6, 1936 |